April 13, 1937.  E. O. RHODES  2,076,592
METHOD OF AND MEANS FOR TESTING
Filed Oct. 23, 1935
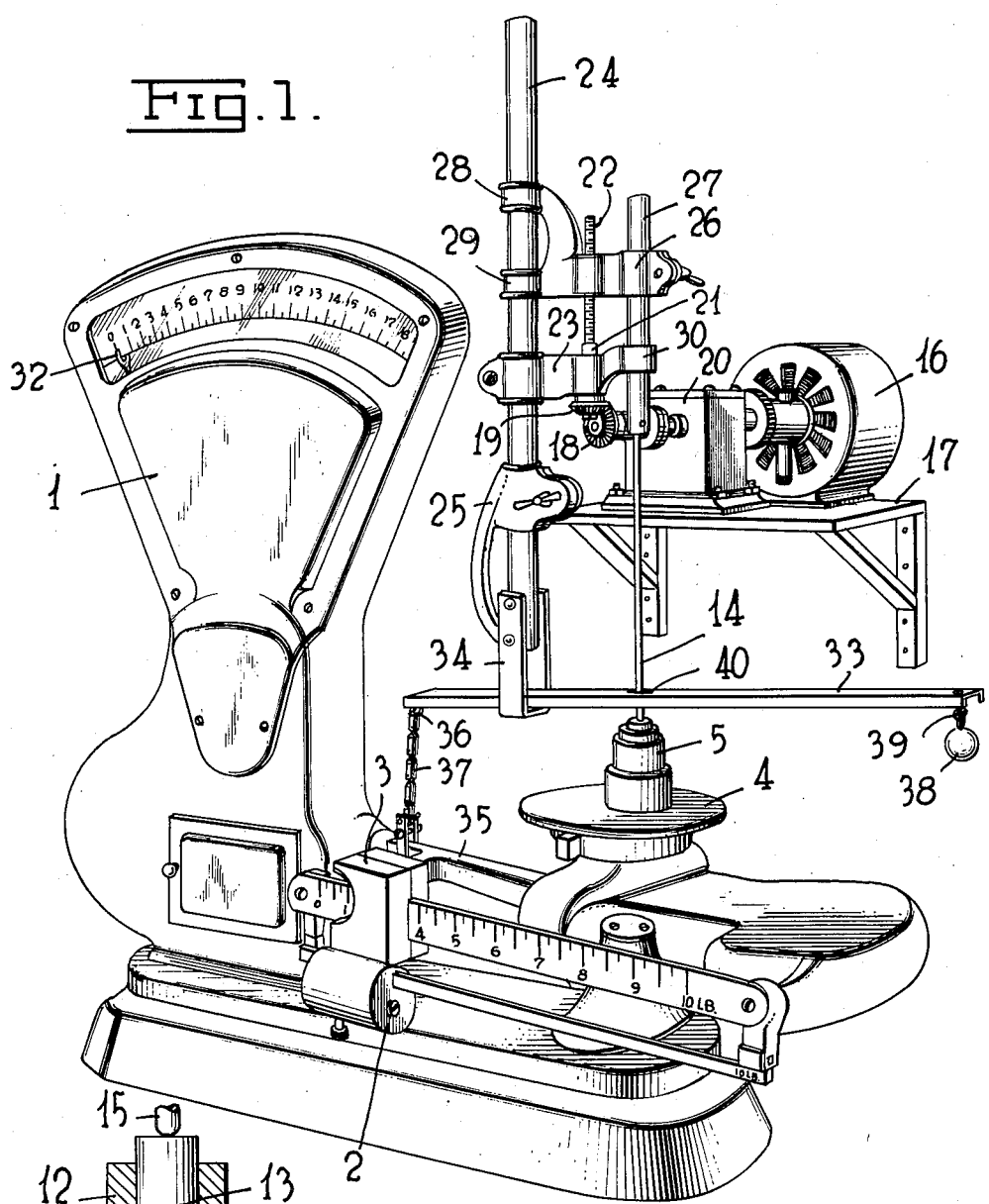

Patented Apr. 13, 1937

2,076,592

UNITED STATES PATENT OFFICE 2,076,592

METHOD OF AND MEANS FOR TESTING

Edmund O. Rhodes, Pittsburgh, Pa., assignor, by mesne assignments, to Koppers Company, a corporation of Delaware Application October 23, 1935, Serial No. 46,364

5 Claims. (Cl. 265—11)

This invention relates to improvements in methods of and apparatus for testing the stability of plastic and semi plastic materials and mixtures.

Stability testing apparatus have heretofore been employed which comprise an ordinary scale and means whereby a load is applied to a specimen to force the material of the specimen through an orifice. One such apparatus includes a cylindrical mold having an orifice in the bottom thereof. A cylindrical plunger is provided and fits snugly in the mold. The diameter of the plunger is therefore the same as the inner diameter of the mold, but substantially greater than the diameter of the orifice. A cylindrical test specimen is placed in the mold and occupies the entire space between the bottom of the mold and the plunger so that one end of the specimen lies across the orifice and rests on an annular solid portion of the bottom and the entire area of the other end of the specimen coincides with, and is acted upon by, the end-face of the plunger. The maximum resistance developed in forcing the material of the specimen through the orifice is determined from the scale and is taken as a measure of stability of the material tested.

The stability of a plastic material has been defined as a measure of the resistance offered to the force causing flow immediately before failing by shearing and tension occurs. An object of the present invention is to provide an apparatus wherein improved means are employed to apply a load to a test specimen in a highly effective manner so as to represent more exactly a shear stress within a test specimen by the applied load.

The apparatus and the method of the present invention will be described in detail in connection with the accompanying drawing in which Fig. 1 is a perspective view of the complete apparatus employed in the test;

Fig. 2 is a vertical sectional view of a portion of the apparatus shown in Fig. 1.

The apparatus shown in Fig. 1 comprises a scale 1 having sliding weights 2 and 3 and a platform 4 on which is placed a means designated generally by the numeral 5 in which the specimen to be tested is placed.

The means 5 is shown in detail in Fig. 2 and comprises a mold 6, preferably cylindrical, having one end supported by a collar member 7 on a shoulder 8 provided inside the collar member. The bottom 9 (otherwise termed a "testing ring") of the mold 6 which may or may not be integral with the cylindrical portion of the mold, is provided with an orifice defined by the bevelled inner edge 10 of the testing ring. The inner edge of the testing ring 9 is bevelled upwardly and presents as little frictional surface as possible. A specimen 11 to be tested, preferably premolded to fit in the mold 6, is shown in position for test and rests on the testing ring 9. A removable spacing member 12 is placed within the mold 6 and its lower end rests on a surface of the specimen 11. The member 12 receives a plunger 13 the lower end face of which, on commencing a test, is brought firmly against the surface of the specimen within the member 12.

An important feature of the present invention is the provision of a plunger 13 of smaller cross sectional area than that of the bottom of the mold 6 in which the plunger operates. The end face of the plunger brought against the specimen is of an area substantially equal to but preferably smaller than the area of the orifice in the bottom of the mold 6. The axis of the plunger if extended, passes through the center of the orifice 10. The face of the plunger is applied to the test specimen so that a core of the material of the specimen is forced through the orifice 10. Regardless of the cross sectional shape of the plunger or the shape of the orifice, these shapes geometrically speaking should preferably correspond or be similar and the distances between the center of the face of the plunger to the outer edge of the said face corresponding to the distances between the center of the orifice and the edge thereof should be substantially equal. The said distances may, however, be slightly less in the case of the face of the plunger as compared with the corresponding distances in the case of the orifice.

The core of the material forced through the orifice in the mold shown in the drawing is substantially the shape of a frustrum of a cone when the area of the face of the plunger is smaller than the area of the orifice. The core is substantially cylindrical in shape when the area of the face of the plunger is equal to the area of the orifice. In any case, the core forced out by the plunger has a less cross sectional area throughout its length than the cross sectional area of the test specimen in any plane substantially at right angles to the direction of the movement of the core.

During a test, the plunger 13 is actuated by a plunger rod 14 that extends from a driving mechanism downwardly to the platform 4 of the scale. The mold is brought under the plunger rod 14 so that the rounded end 15 of the rod engages the center of the plunger 13.

The plunger rod 14 is vertically actuated by a constant speed motor 16 mounted on an elevated platform 17. The motor 16 operates bevel wheels 18 and 19 by means of any suitable gear arrangement provided in a gear box 20. The bevel wheel 19 is mounted on a vertical spindle 21 provided on its upper portion with a continuous thread 22. The spindle 21 is prevented from any vertical movement by thrust bearings located in a clamp 23. The clamp 23 is rigidly attached to a vertical cylindrical support 24 which in turn is attached to the platform 17 by a clamp 25.

The upper threaded portion 22 of the spindle 21 extends through a threaded passage in a sliding clamp 26 rigidly attached to a vertical cylindrical member 27 to which is connected the plunger rod 14. The clamp 26 is provided with two arms having bearings 28 and 29 that slide along the cylindrical support 24. The rotation of the threaded means 22 causes vertical movement of the clamp 26 which in turn transfers vertical movement to the member 27. The movement of the member 27 is guided by a bearing 30 on the clamp 23. The gear ratios and the pitch of the thread on the spindle 21 are selected to give a relatively low velocity to the plunger rod 14 with a given speed of the motor 16.

In conducting a test on a binder for bituminous road material, a test sample is prepared from a mixture of about 97 per cent by weight of standard Ottawa river sand and about three per cent by weight of the binder. For testing such material, a cylindrical mold having an inside diameter of as small as one inch and a height of one and one-half inches may be used. The testing ring may in this instance have an opening seven-eighths of an inch in diameter. About fifteen grams of the above mixture are placed in the mold 6. The mold is then brought to a temperature of about 25° C. whereupon the mixture is subjected to a pressure of approximately 3300 pounds per square inch for about 1 minute. After this operation the specimen of the above mixture fills the mold to approximately one-half its height.

For proper comparison each sample of materials tested is subjected to the same conditions before testing. If desired, a bath (not shown) having thermostatically controlled heating means may be provided for the mold by which materials may be maintained at a uniform temperature while under test. Different materials may be tested under different conditions depending largely on the conditions under which they are used.

The parts of the means 5 are assembled as shown in Fig. 2 and placed on the platform 4 of the scale under the plunger rod 14 as set forth above. The sliding weights 2 and 3 are adjusted to balance the weight on the platform. The motor 16 is started and the end of the plunger rod 14 in contact with the plunger 13 moves the latter down into the mold. A satisfactory velocity at which the plunger rod 14 is moved is about three inches per minute.

With progressing motion of the plunger rod 14 the scale platform is depressed and the pressure applied at any given moment to the test specimen 11 is indicated by the scale. Immediately after the yield point of the test specimen has been reached, the pressure exerted on the platform 4 decreases, since shearing of the specimen occurs, and the indicator 32 of the scale will drop. The maximum load indicated is taken as a measure of the stability of the specimen.

In the use of a scale having a relatively small range, the latter may be increased by means of an attachment such as that shown in Fig. 1. A lever 33 rests on knife edges (not shown) provided in a loop extension 34 on the lower end of the vertical member 24 above the balance beam 35 of the scale. One end 36 of the lever 33 is attached to the balance beam 35 by means of a flexible chain 37. A counterweight 38 is hung on a hook 39 provided on the opposite end of the lever 33. To prevent undue interference of the lever 33 with the plunger rod 14, a slot 40 may be provided in the lever through which the plunger rod passes. By this arrangement the counterweight 38 applies an upward force to the scale platform, thus opposing the pressure transmitted to the platform by the plunger rod 14. By increasing the mass of the counterweight 38, the maximum capacity of a scale may be increased many times without unduly impairing the accuracy of the scale.

The herein described test may be employed to determine the binding properties of any given plastic substance as well as the stability of the plastic itself. Any aggregate or filler of uniform size and shape may be mixed with a binder, and test specimens prepared therefrom.

By reason of the arrangement of parts employed in the apparatus shown in the drawing, it is possible to provide testing units that are of relatively small size particularly adapted to use in smaller laboratories and to be placed on laboratory tables. Reliable results are obtained, and the force exerted upon the plunger in the mold of the present apparatus, represents a true shear stress within a test specimen.

I claim:

1. In apparatus for testing the stability of plastic and semi-plastic materials and mixtures, the said apparatus including a mold adapted to receive a test specimen, the said mold being provided with an outlet orifice and a plunger orifice, a plunger movable into the said mold and in alinement with the said outlet orifice, means for actuating the said plunger to load the test specimen, and means for indicating the resistance developed in forcing a portion of the said test specimen through the said outlet orifice; the surface area of the face of the said plunger in contact with the surface of the test specimen being slightly less than to substantially the same as the area of the said outlet orifice but not as great as the area of the face of the specimen acted on by the said plunger.

2. In a method of testing the stability of plastic and semi-plastic materials and mixtures, which method comprises preparing a test specimen of predetermined weight by compacting the material to be tested at a predetermined pressure and temperature and for a predetermined period of time, the steps of confining the specimen of material, applying pressure to a portion of the surface of the specimen to force a core of the said material out of the said specimen and determining the pressure required for forcing the said core through the material of the specimen, the said core throughout its length having a less cross sectional area than the cross sectional area of the specimen in any plane substantially at right angles to the direction of movement of the said core.

3. In a method of testing the stability of plastic and semi-plastic materials and mixtures, the steps comprising confining a specimen of a material, applying pressure to a portion of the surface of the said specimen to force a core of the said material out of the specimen, and determining the pressure required for forcing the said core through the substance of the said specimen, the said core throughout its length having a less cross sectional area than the cross sectional area of the specimen in any plane substantially at right angles to the direction of movement of the said core.

4. In apparatus for testing the stability of plastic and semi-plastic materials and mixtures, a chamber for material to be tested, the said chamber having on one side thereof an outlet orifice and on an opposite side thereof a plunger orifice, and a plunger movable through the said plunger orifice into the said chamber and toward the said outlet orifice, the said plunger being in substantial alignment with the outlet orifice and having an end face substantially corresponding to the orifice in figuration but not exceeding the latter in area.

5. In apparatus for testing the stability of plastic and semi-plastic materials and mixtures, a chamber for material to be tested, the said chamber having on one side thereof an outlet orifice and on an opposite side thereof a plunger orifice, a plunger movable through the said plunger orifice into the said chamber and in alignment with the said outlet orifice, and guide means for preventing the plunger from applying a direct pressure on material in the portion of the chamber around the said plunger orifice and the said outlet orifice.

EDMUND O. RHODES.